US008322261B2

(12) United States Patent
Liu et al.

(10) Patent No.: US 8,322,261 B2

(45) Date of Patent: Dec. 4, 2012

(54) LOCKING CONSTRUCTION FOR A MITER SAW HAVING A HINGED LINEAR GUIDE MECHANISM

(75) Inventors: Jie Liu, Lisle, IL (US); Al Pierga, Barrington, IL (US)

(73) Assignee: Robert Bosch GmbH, Stuttgart (DE)

(*) Notice: Subject to any disclaimer, the term of this patent is extended or adjusted under 35 U.S.C. 154(b) by 237 days.

(21) Appl. No.: 12/797,043

(22) Filed: Jun. 9, 2010

(65) Prior Publication Data

US 2011/0303065 A1 Dec. 15, 2011

(51) Int. Cl.
*B23D 45/14* (2006.01)

(52) U.S. Cl. .......... 83/485; 83/471.3; 83/477.1; 83/581; 83/630

(58) Field of Classification Search .................... 83/485, 83/486, 486.1, 471.2, 471.3, 472, 473, 477, 83/477.1, 581, 630, 490

See application file for complete search history.

(56) References Cited

U.S. PATENT DOCUMENTS 1,763,244 A 6/1930 Mattison
2,320,743 A * 6/1943 Nilsen et al. .................... 83/397
2,569,354 A * 9/1951 Tracy ............................ 248/662
2,579,862 A 12/1951 Richardson
2,664,924 A 1/1954 Tracy
4,011,782 A 3/1977 Clark et al.
4,614,140 A 9/1986 Macksoud
5,438,899 A * 8/1995 Hoyer-Ellefsen ............ 83/471.3
6,892,618 B2 * 5/2005 Chin-Chin ...................... 83/485
7,503,246 B2 3/2009 Imamura et al.
2003/0226436 A1 * 12/2003 Higuchi ....................... 83/471.3
2004/0112190 A1 * 6/2004 Hollis et al. ...................... 83/13
2007/0137452 A1 6/2007 Oberheim
2010/0212467 A1 * 8/2010 Oohama ...................... 83/471.2

* cited by examiner

*Primary Examiner* — Phong Nguyen

(74) *Attorney, Agent, or Firm* — Greer, Burns & Crain, Ltd

(57) ABSTRACT

Embodiments of a power miter saw comprise a saw base, a rotatable table, a miter arm, a saw blade and motor assembly operatively connected to the table, a hinged linear guide mechanism configured to support and move the assembly along a predetermined linear path, the mechanism comprising a first hinge having first and second links pivotably connected together by a first shaft extending through aligned openings therein, and a locking lever having a handle and a locking blade at opposite end portions and a pivot portion with a pivot connection therebetween for pivotably mounting the lever to one of the links, the blade being configured to fit within a gap between adjacent surfaces of the first and second links when the guide mechanism is in one of its extended or retracted positions and the lever is moved into a locked position.

10 Claims, 8 Drawing Sheets

LOCKING CONSTRUCTION FOR A MITER SAW HAVING A HINGED LINEAR GUIDE MECHANISM

BACKGROUND OF THE INVENTION

The present invention generally relates to power tools, and particularly power miter saws.

Power miter saws continue to be the subject of research and developmental efforts that are improving the design and operation of such saws. The improved design also improves the accuracy of cuts that are made by the miter saw as well as provide durable and stable operation over an extended useful life. In addition, increased functionality is provided at very little additional cost to the consumer, including the capability of the miter saw to have the blade and motor assembly traverse a generally horizontal path to increase the width of a cut made on a work piece or to cut larger scale crown molding and other trim work that is performed by trim carpenters and other tradesmen.

Recent developments that have been made by inventors with the Robert Bosch Tool Company utilize horizontal linkages that are combined with transverse linkages which enable such reciprocating movement to have a high degree of stability which contributes to extreme accuracy in the making of cuts on work pieces. Not only that, the use of such linkages eliminates sliding bushings and the like which are relatively more expensive and are prone to having their operability at least partially compromised by exposure to dust, wood cuttings and the like during operation.

SUMMARY OF THE INVENTION

Embodiments of a power miter saw comprise a saw base, a table rotatably connected to the saw base, a miter arm assembly for angularly positioning the table relative to the saw base, a saw blade and motor assembly operatively connected to the table, a multiple link hinged linear guide mechanism configured to support the saw blade and motor assembly and enable movement of the assembly along a predetermined linear generally horizontal path between extended and retracted positions, the mechanism comprising a first hinge having first and second links pivotably connected together by a first shaft extending through aligned openings therein, the first link being pivotably connected with the assembly by a second shaft and the second link being pivotably connected to the table by a third shaft, the first, second and third shafts being parallel to one another, the second link having at least one outwardly extending mounting tab adjacent the first shaft, and a locking lever having a handle and a locking blade at opposite end portions and a pivot portion with a pivot connection therebetween for pivotably mounting the lever to the tab, the blade being configured to fit within a gap between adjacent surfaces of the first and second links when the guide mechanism is in one of its extended or retracted positions and the lever is moved into a locked position.

DETAILED DESCRIPTION

Embodiments of the present invention are disclosed which are directed to a power miter saw that has a base, a rotatable table, a miter arm assembly for angularly positioning the table relative to the base, a saw blade and motor assembly that is operatively connected to the table as well as a multiple hinged linear guide mechanism that is configured to have the saw blade and motor assembly move in a generally horizontal path so that work pieces that are placed on the table that have a width that exceeds the normal width of cutting that can be accomplished by merely moving the blade downwardly into the cutting position. The movement in the horizontal path enables a much wider work piece to be cut.

With the capability of the linear guide mechanism to move the saw blade and motor assembly between fully extended and fully retracted positions, the size capacity of work pieces that can be cut by the saw is increased as described above. However, there is a desirability for locking guide mechanism in its fully retracted position for performing chop cuts where the horizontal movement along the path is unnecessary. It is also desirable to lock it in its fully extended position for transporting the miter saw to and from a jobsite, for example.

The embodiments of the present invention include a locking lever that is configured to cooperate with features of the linear guide mechanism which are also part of the embodiments of the present invention, for locking the linear guide mechanism in either its extended or retracted position. The locking lever is operative in an intuitive, easy to use manner and is extremely reliable, inexpensive to manufacture and in connection with the features of the linear guide mechanism, elegant in its design simplicity.

Figure 1:
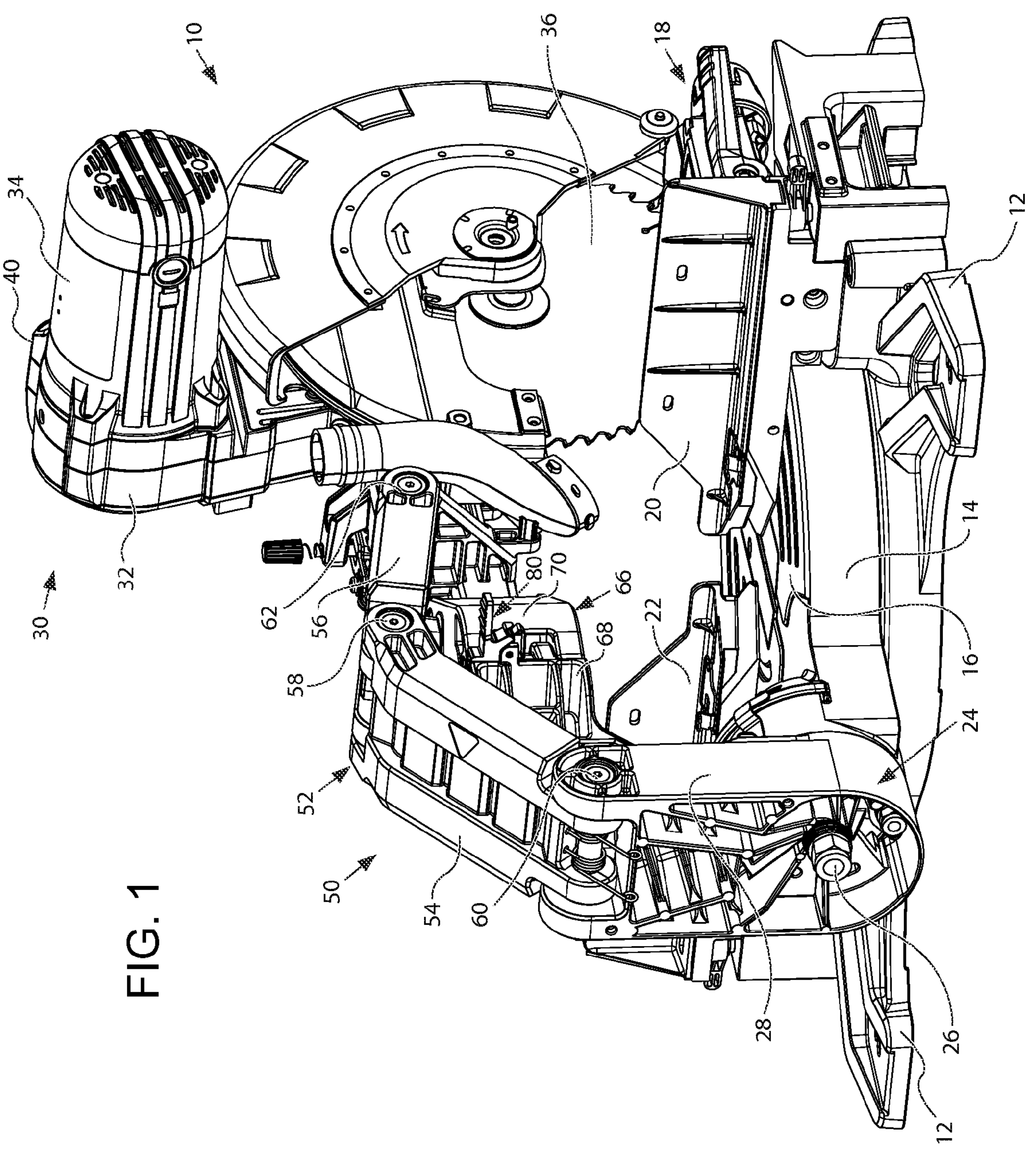
FIG. 1 is a left rear perspective view of a power miter saw incorporating a preferred embodiment of the present invention, and particularly illustrating a power miter saw that has a linear guide mechanism that permits reciprocating movement of its blade and motor assembly along a generally horizontal path, with the mechanism and assembly being shown in their extended position.

Turning now to the drawings, and particularly FIG. 1, a miter saw, indicated generally at 10, is illustrated and includes a base 12, a rotatable table 14 that has a top surface 16 upon which a work piece can be placed. The table 14 is pivotably connected to the base 12 for rotation, the rotation of which is controlled by a miter arm assembly, indicated generally at 18. The miter arm assembly 18 generally has the capability of having a quick release for placing the table at an appropriate desired angle so that miter cuts as desired can be made and also has a knob which can be tightened to lock the table in a desired position to cut a particular miter angle. The miter saw 10 preferably has left and right adjustable fence portions 20 and 22, respectively, for holding a work piece in a desired position.

The table 14 has a rear bevel adjustment structure, indicated generally at 24, which has a generally horizontal shaft 26 about which a generally vertical extension blasting 28 can be rotated about the shaft 26. The saw 10 includes a saw blade and motor assembly, indicated generally at 30, which includes a housing 32, which includes a motor 34, with the housing 32 including a gear mechanism (not shown) that drives a blade 36. The housing also has a head structure which includes a generally horizontal shaft (not shown) about which the blade and motor assembly can be rotated from an elevated rest position downwardly into a cutting position. A handle 40 is used by an operator to pull the blade and motor assembly downwardly in a cutting position and is preferably biased upwardly toward its rest position.

The saw 10 includes a multiple link hinged linear guide mechanism, indicated generally at 50, shown in FIGS. 1-5, with FIGS. 2-5 showing the guide mechanism in an enlarged manner. The linear guide mechanism 50 includes a horizontal hinge, indicated generally at 52, comprised of links 54 and 56 which are pivotably connected together by pivot connection 58 that preferably comprises a shaft that is seated in bearings or the like in a manner that substantially eliminates any play in the pivot connection and thereby provides a high degree of accuracy during operation.

The link 54 is also pivotably connected to the extension casting 28 by a pivot connection 60 and the link 56 is connected to the head structure of blade and motor assembly housing 32 by a pivot connection 62. The pivot connections 58, 60 and 62 are parallel to one another and are generally horizontal in their orientation relative to the table top 16 when the bevel setting is zero, i.e., the extension 28 is also perpendicular to the table top 64.

Figure 4:
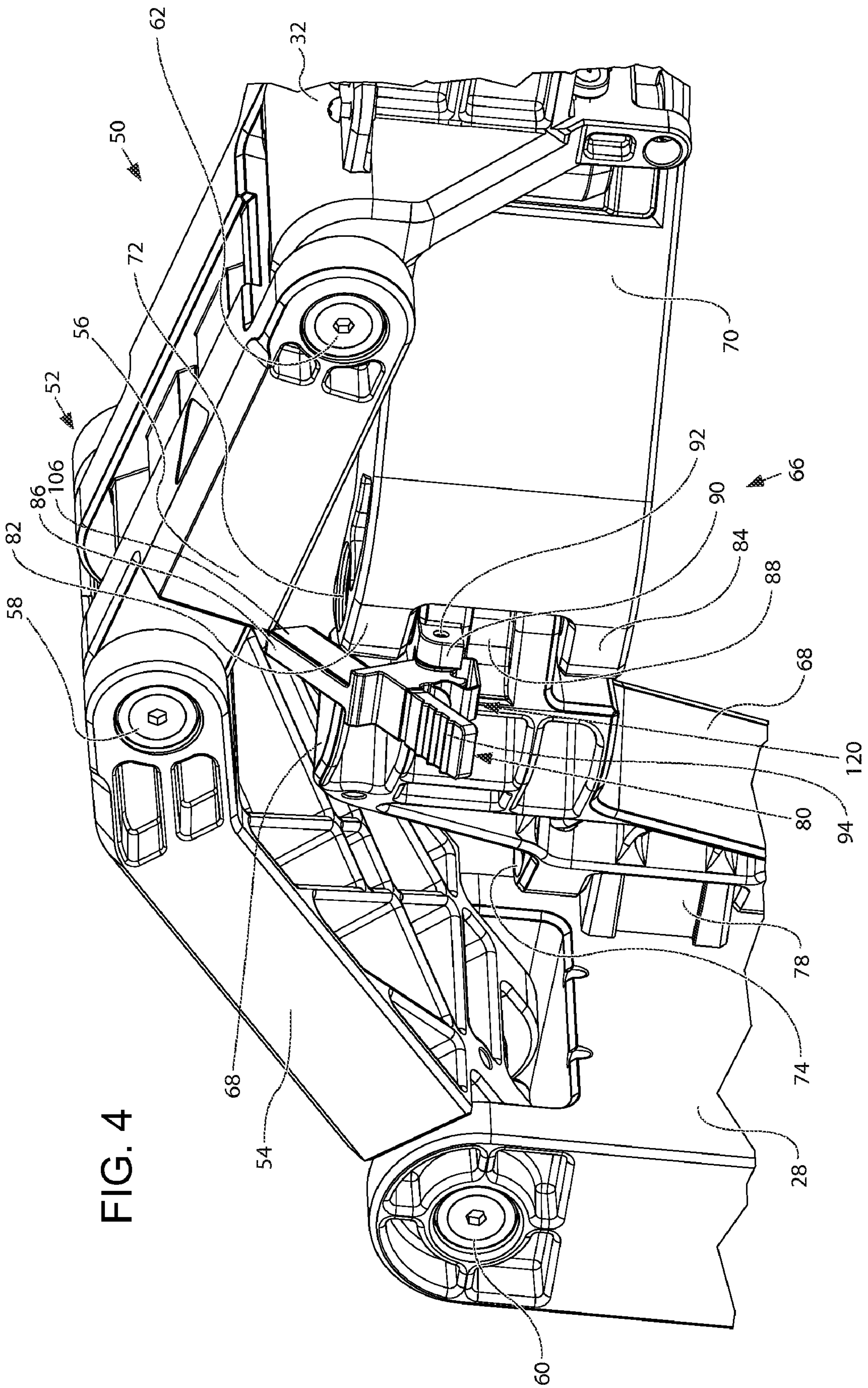
FIG. 4 is a left front perspective view, similar to FIGS. 2 and 3, but illustrating a larger portion of the linear guide mechanism shown in its extended position, with the locking lever in its unlocked position.
Figure 5:
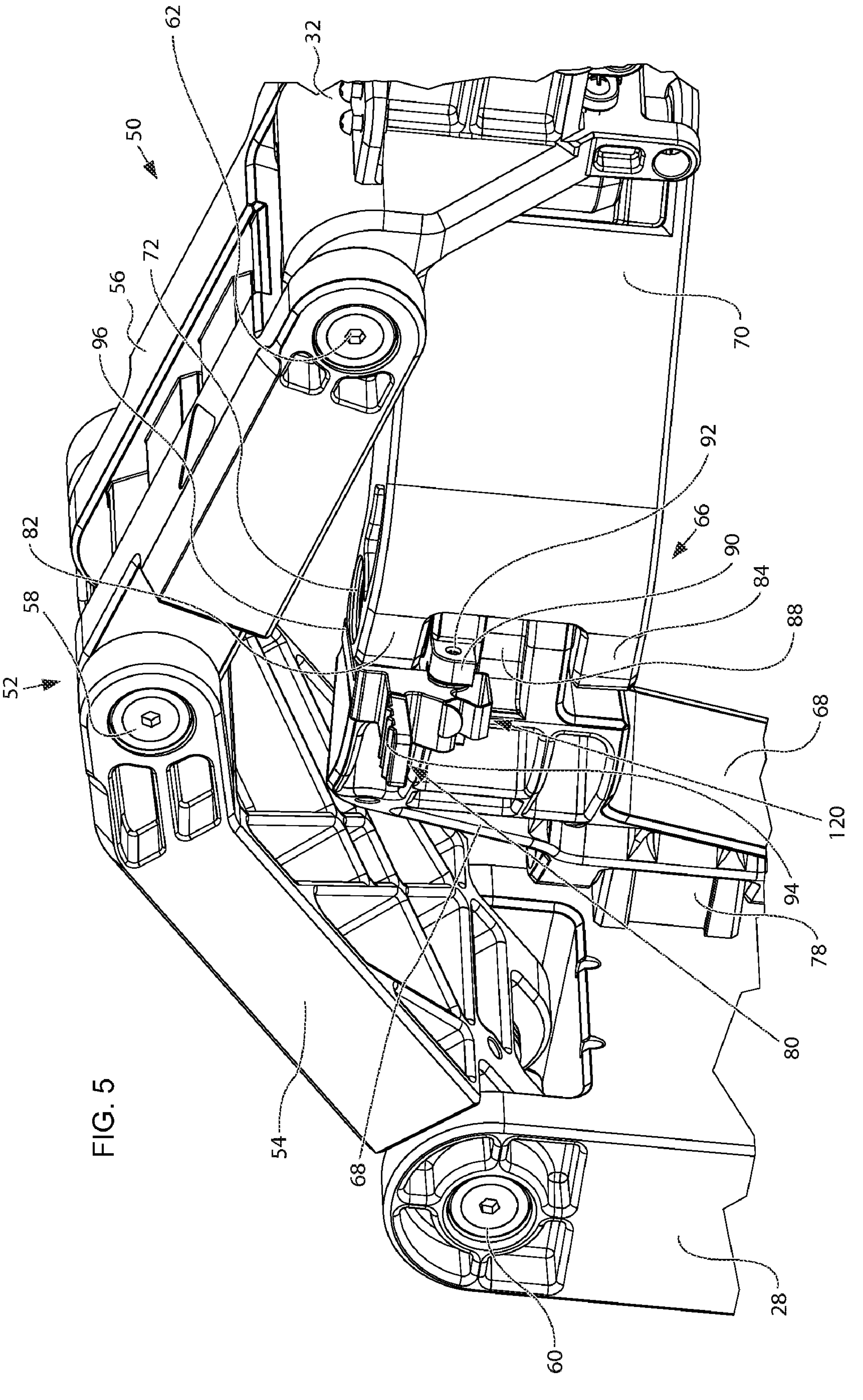
FIG. 5 is another perspective view of power miter saw, nearly identical to FIG. 4, except with the locking lever in its locked position.
Figure 6:
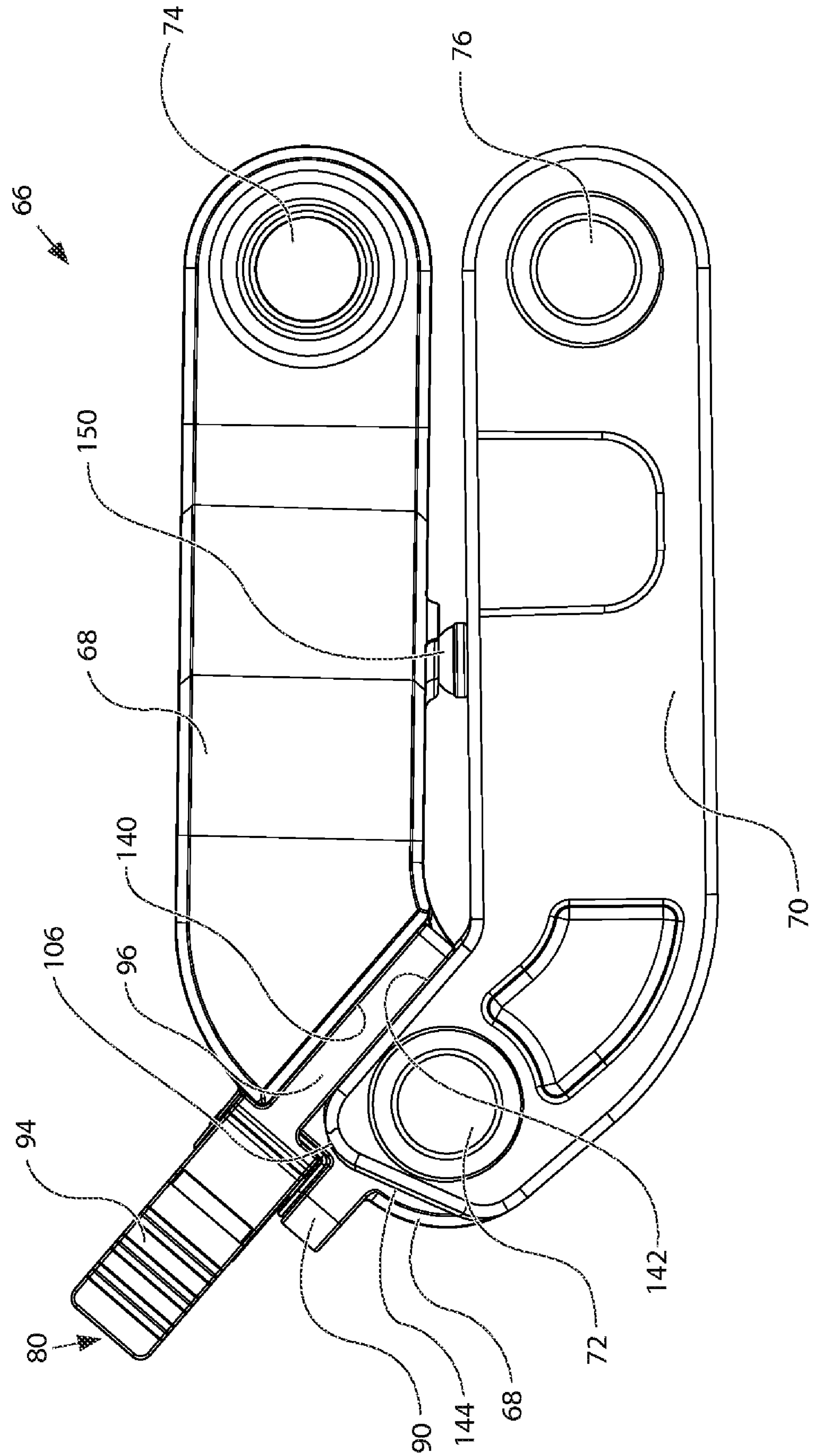
FIG. 6 is a top view of a portion of the linear guide mechanism in its retracted position and the locking lever in its locked position
Figure 7:
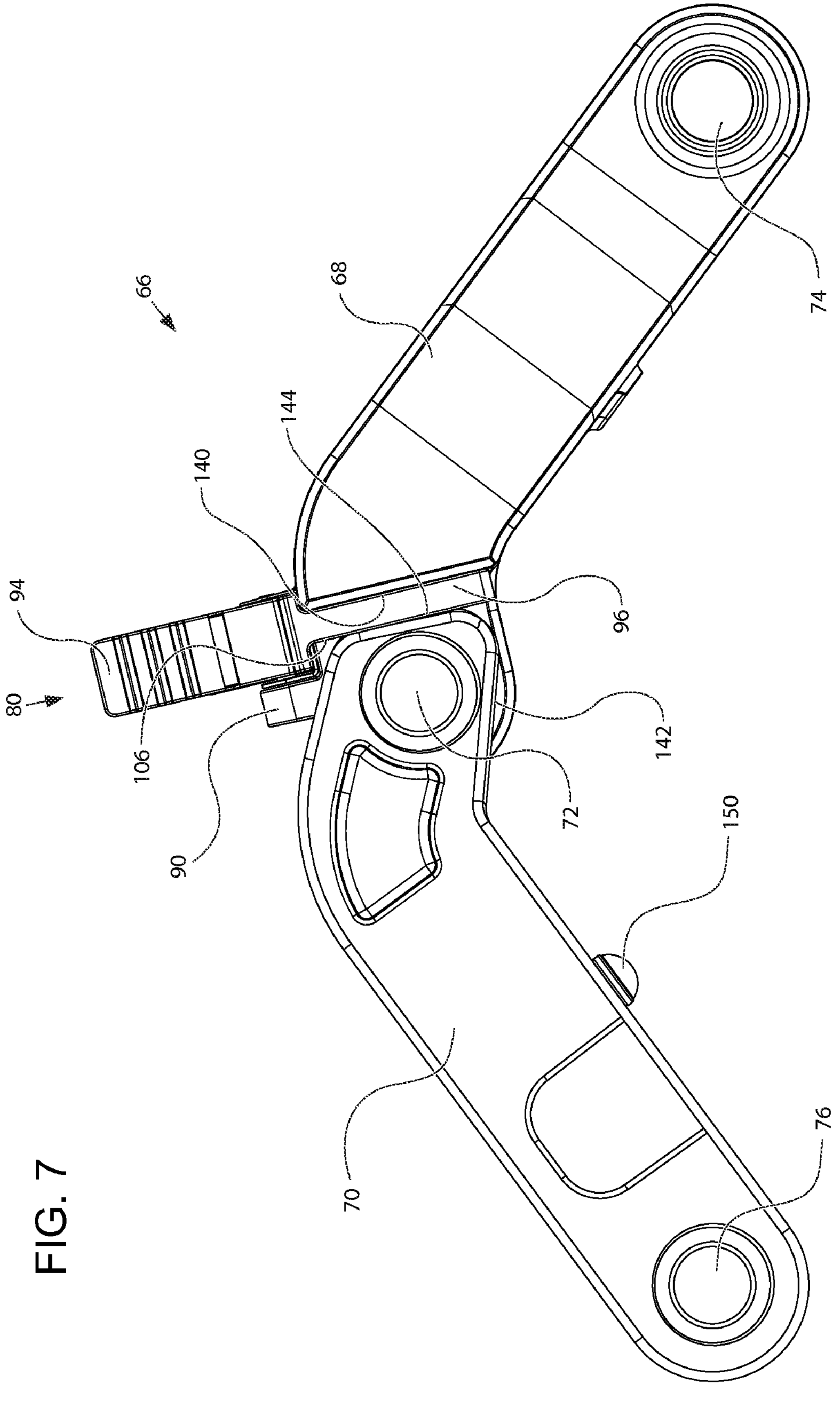
FIG. 7 is a top view of a portion of the linear guide mechanism in its extended position and the locking lever in its locked position.

The linear guide mechanism 50 also includes a vertical hinge, indicated generally at 66, which includes links 68 and 70 that are connected together by pivot connection 72 with the link 68 also being connected to the extension casting 28 by pivot connection 74 and the link 70 is connected to the housing 32 by pivot connection 76 as best shown in FIGS. 6 and 7. The three pivot connections 72, 74 and 76 are parallel to one another and are generally vertically oriented and also perpendicular to the orientation of the pivot connections 58, 60 and 62 of the horizontal hinge 52. The pivot connection 74 connects the links 68 to a bracket 78 that is formed with the extension casting 28 as best shown in FIGS. 4 and 5.

All of the pivot connections of the linear guide mechanism are preferably shafts that are journaled in bearings in a configuration whereby there is virtually no play in the joints which would result in anything but pivotal movement of the links relative to one another or to structure to which they are attached so that the stability of the miter saw is excellent which results in accuracy of the cuts that are made by the saw.

Figure 2:
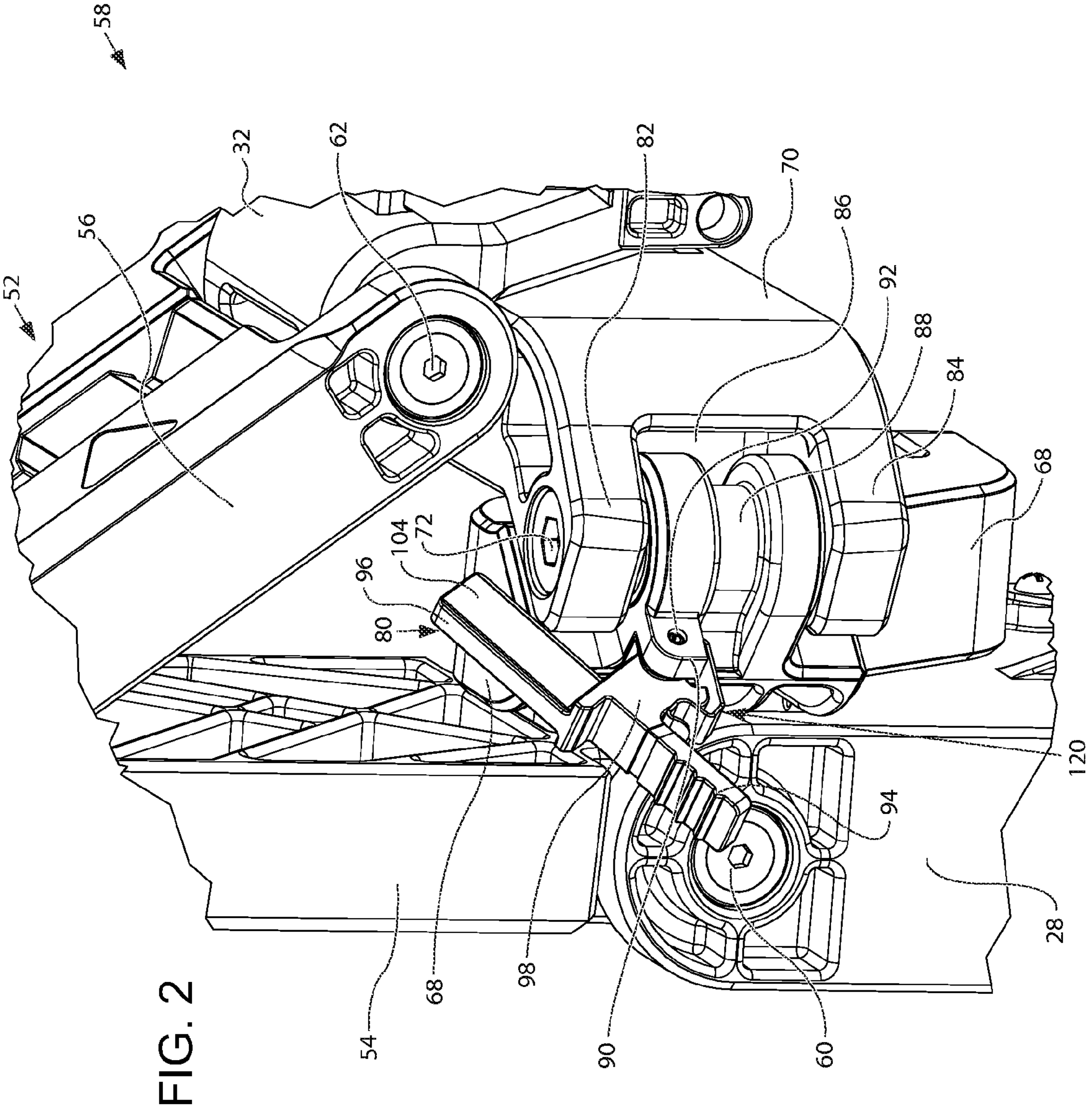
FIG. 2 is an enlarged perspective view of the power miter saw shown in FIG. 1, particularly illustrating portions of the linear guide mechanism and a locking lever, with the linear guide mechanism and the assembly in their retracted position and the locking lever in an unlocked position.
Figure 3:
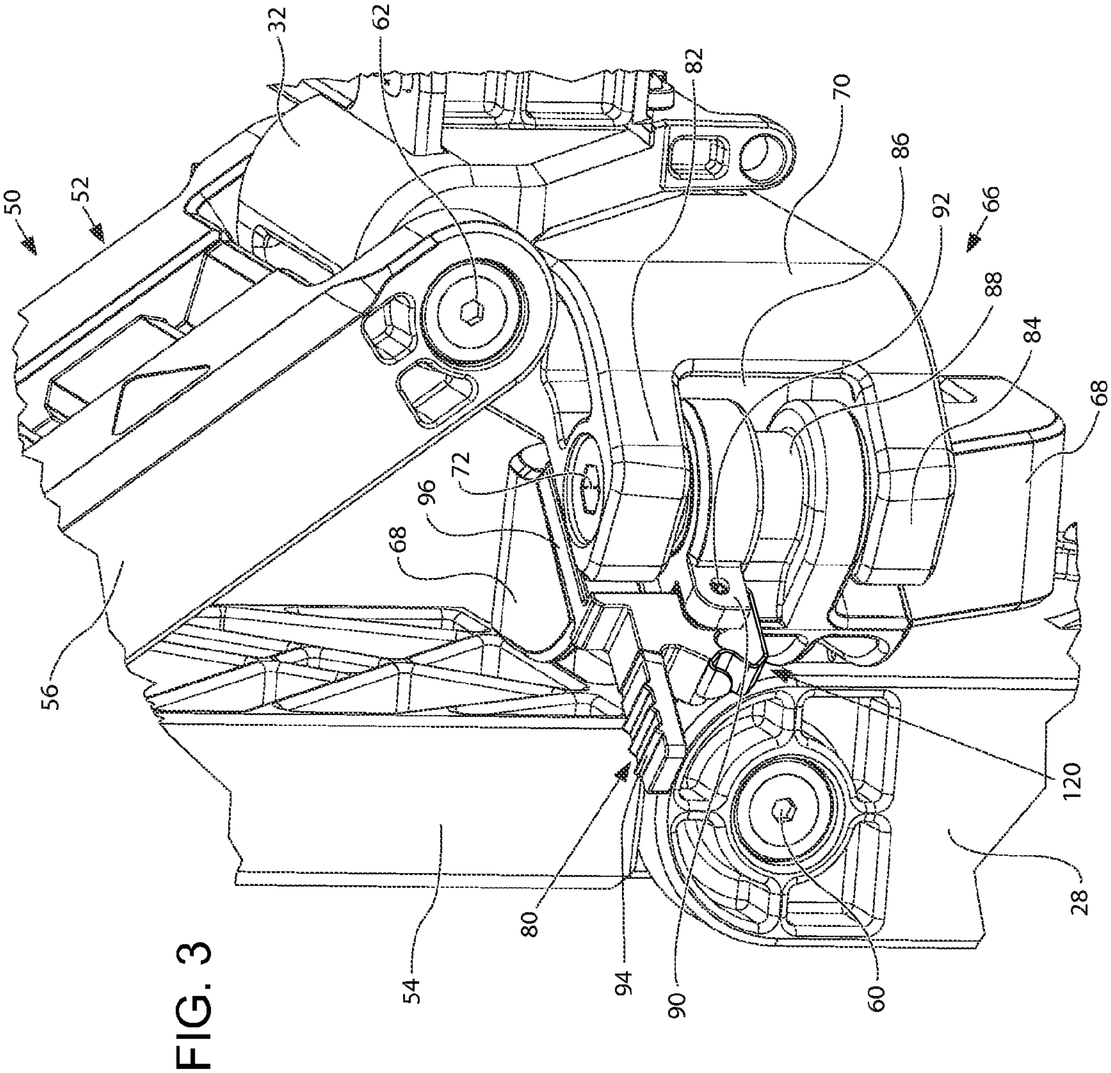
FIG. 3 is another perspective view of power miter saw, nearly identical to FIG. 2, except with the locking lever in a locked position.

As should be understood from the interaction of the horizontal and vertical hinges 52 and 66, the linear guide mechanism 50 causes the shaft 62 to move in a linear path that is preferably substantially parallel to the plane of the table top 16. The linear guide mechanism 50 enables the blade and motor assembly to be moved from its extended position as shown in FIGS. 1, 4 and 5 where the blade is moved to the right of the fence as shown in FIG. 1 to a retracted position as shown in FIGS. 2, 3 and 6 where the blade is in position to desirably perform chop cuts on work pieces that are placed in abutting contact with the fence 20, 22.

As previously mentioned, it is desirable to have a miter saw with the reciprocating movement capability as has been described with regard to the saw 10. It is also desirable to be able to lock the linear guide mechanism in its retracted position where chop cuts are made by a user and the linear guide mechanism does not "roll out" from the cutting position. In keeping with the present invention, a locking lever, indicated generally at 80, is provided, which together with the configuration of the links 68 and 70 of the vertical hinge 66 enables the linear guide mechanism to be locked in either of its extended or retracted positions. In this regard, the locking lever 80 is pivotably mounted to the link 68 and can be moved between locked position as shown in FIGS. 1, 3, 5, 6 and 7 or an unlocked position as shown in FIGS. 2 and 4.

When the locking lever 80 is in its locked position, it fits within two adjacent gapped surfaces of links 68 and 70 which prevents the pivot connection 72 from pivoting. The configuration of the links near the pivot connection 72 is important. Referring initially to FIGS. 2 and 3, it is shown that the link 70 has upper and lower end portions 82 and 84 with a recess 86 therebetween in which a tongue portion 88 of the link 68 fits. It should be apparent that the pivot connection 72 fits within openings in the upper and lower end portions as well as the tongue portion 88 to define the pivot connection.

Figure 8:
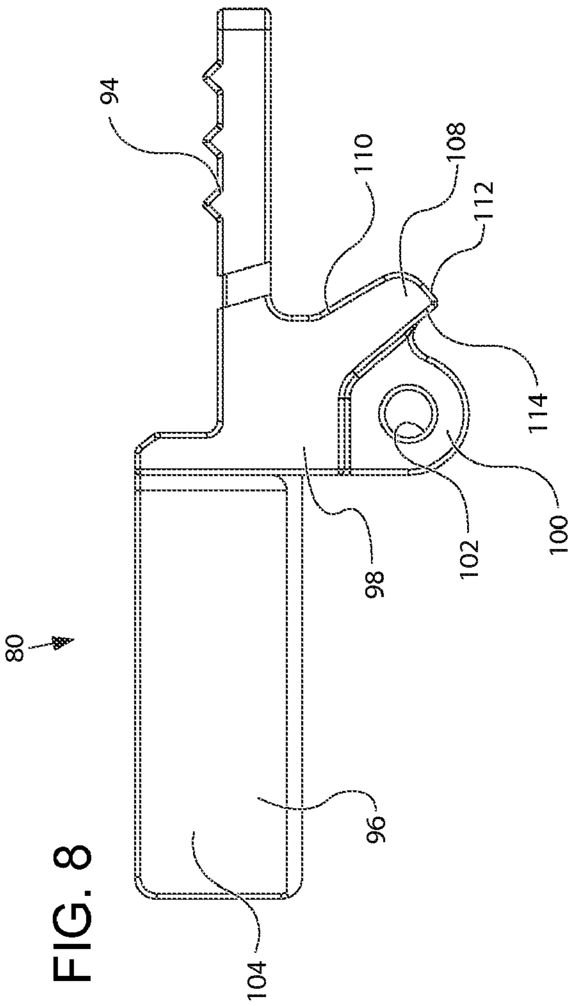
FIG. 8 is a side view of the locking lever.

The link 68 has an outwardly extending tab portion 90 that has an aperture 92 therein for receiving a pin or bolt 92 for providing a pivot connection to the locking lever 80. The locking lever 80 is shown in detail in FIGS. 8 and 9 and has a handle portion 94 at its right end thereof, a locking blade 96 at the left end portion thereof and a pivot portion 98 between the handle and blade 94 and 96. The pivot portion 98 has a lower portion 100 with a reduced thickness in which a nut for a bolt used to interconnect the locking lever 80 with the tab 90 can reside without extending beyond the outermost surface of the portion 98.

Figure 9:
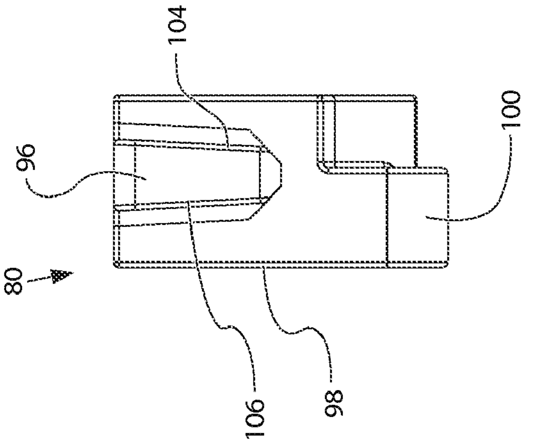
FIG. 9 is a left end view of the locking lever as shown in FIG. 8.

The blade portion 96 has opposite faces 104 and 106 which are slightly inclined to more easily be rotated into locking engagement. The pivot portion 98 also has a stop extension 108 with a back surface 110, an end surface 112 and a stop surface 114 which is configured to prevent the locking lever from rotating more than approximately 60° when it is in its unlocked position as shown in FIG. 2, for example. The mass of the blade portion 96 relative to the pivot portion 98, as best shown in FIG. 9, enables the design of the locking lever to be such that the center of gravity prevents the locking lever 80 from engaging due to gravity when it is in the disengaged or unlocked position.

Figure 10:
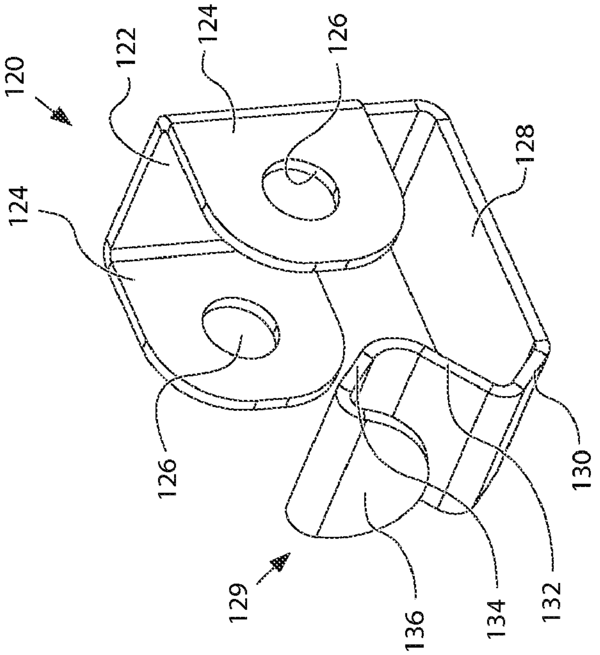
FIG. 10 is a perspective view of a spring clip that can be used in an alternative embodiment of the present invention.

Alternative embodiments can utilize a spring clip 120 such as is shown in detail in FIG. 10 and also in FIGS. 2-5. The clip includes a base portion 122 having side wings 124 with apertures 126 which are configured to be spaced apart to enable the locking lever 80 to fit between the wings 124 and be held in place by the pin or bolt that interconnects the locking lever 80 with the tab 90. The clip 120 has a forward extension 126 and a clamping portion, indicated generally at 128, that includes angled surfaces 130, 132, 134 and 136 for engaging the surfaces 108, 110, 112 and 114 of the pivot portion 98 of the locking lever 80. For example, as shown in FIG. 2, when the locking lever 80 is in its disengaged or unlocked position, it is apparent that the inside surfaces of portions 132 and 134 of the clip 120 are in contact with the back surface 110 of the pivot portion 98 of the locking lever 80. Also, as is evident from FIG. 3, when the locking lever is in its locked position, the surface 134 of the clip 120 is contacting the end surface 112 of the pivot portion 98 of the locking lever 80. The spring clip 120 is preferably configured to require an operator to impose a force significantly greater than gravity to engage and disengage the locking lever 80.

As previously mentioned, the configuration of the links 68 and 70 is designed to interact with the locking lever 80 to lock the linear guide mechanism 50 in either its extended or retracted positions. This is best shown in FIGS. 6 and 7 which is a top view of the links 68 and 70 together with the locking lever 80 shown in its locked position, with FIG. 6 showing it being locked in the retracted position and FIG. 7 in its extended position. The link 68 which has the tab 90 upon which the locking lever 80 is pivotably connected has a surface 140 that is configured to engage the surface 104 of the blade portion 96 whether it is locked in the extended or the retracted position.

When it is in the retracted position and referring to FIG. 6, the surface 106 of the blade 96 is positioned to engage a surface 142 of the link 70. The distance between the adjacent surfaces 140 and 142 defines a gap that is generally slightly larger than the thickness of the blade portion 96 at its maximum dimension, i.e., at the top of the blade portion 96 as shown in FIG. 9. When the linear guide mechanism is placed in its extended position, and referring to FIG. 7, then a surface 144 is positioned to contact the surface 106 of the locking lever 80.

A rubber bumper 150 may be provided which as shown in FIG. 6 would tend to urge the links 68 and 70 apart which would apply some degree of compression of the blade 96 to hold it in a locked position if the embodiment did not include a spring clip 120.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. A power miter saw comprising:

a saw base;

a table rotatably connected to said saw base;

a miter arm assembly for angularly positioning said table relative to said saw base;

a bevel adjustment assembly pivotally mounted to said table by an elongated shaft that extends through said table, said bevel adjustment assembly pivoting about said elongated shaft;

a multiple link hinged linear guide mechanism pivotally connected to said bevel adjustment assembly at one end and configured to support a saw blade and motor assembly at an opposite end, said multiple link hinged linear guide enabling movement of said saw blade and motor assembly along a predetermined linear generally horizontal path between extended and retracted positions;

said multiple link hinged linear guide mechanism comprising a first hinge having first and second links pivotably connected together by a first shaft extending through aligned openings therein, said first link being pivotably connected with said saw blade and motor assembly by a second shaft and said second link being pivotably connected to said bevel adjustment assembly by a third shaft, said first, second and third shafts being parallel to one another;

said second link having at least one outwardly extending mounting tab adjacent said first shaft;

a locking lever having a handle and a locking blade at an opposite end portion and a pivot portion with a pivot connection therebetween for pivotably mounting said locking lever to said mounting tab, said locking blade being configured to fit within a gap between adjacent surfaces of said first and second links when said multiple link hinged linear guide mechanism is in one of its extended or retracted positions and said locking lever is moved into a locked position.

2. A power miter saw as defined in claim 1 wherein said locking blade is elongated with first and second sides and a thickness that is slightly less than the width of said gap, said first side generally contacting a first contacting surface of said second link which defines one side of said gap, said second side of said locking blade being configured to contact a second contacting surface on said first link when said guide mechanism is in its retracting position and a third contacting surface on said first link when said guide mechanism is in its extended position.

3. A power miter saw as defined in claim 2 wherein said second and third contacting surfaces are at a predetermined angle relative to one another.

4. A power miter saw as defined in claim 3 wherein said predetermined angle is in the range of about 60 degrees to about 90 degrees.

5. A power miter saw as defined in claim 2 wherein said first link has spaced apart end portions with said aligned openings for connection to said by second link by said first shaft, said second link having an end portion with an aligned opening that fits within said spaced apart end portions, said first link having said second and third contacting surfaces on at least one of said spaced apart end portions.

6. A power miter saw as defined in claim 1 wherein said adjacent surfaces of said first and second links when said guide mechanism is in one of its extended or retracted positions are generally parallel to one another.

7. A power miter saw as defined in claim 1 wherein said linear guide mechanism further comprising a second hinge having third and fourth links pivotably connected together by a fourth shaft extending through aligned openings therein, said third link being pivotably connected with said saw blade and motor assembly by a fifth shaft and said fourth link being pivotably connected to said bevel adjustment assembly by a sixth shaft, said fourth, fifth and sixth shafts being parallel to one another and generally perpendicular to said first, second and third shafts.

8. A power miter saw as defined in claim 1 further comprising a spring clip for biasing said lever in either its locked position or an unlocked position.

9. A power miter saw as defined in claim 8 wherein said pivot portion of said locking lever has an outwardly extending tab portion configured to engage said spring clip and resiliently hold said locking lever in either its locked or unlocked position.

10. A power miter saw as defined in claim 9 wherein said spring clip has a pair of spaced apart mounting wings with openings therein for mounting said clip to said first link at said locking lever pivot connection.

* * * * *